(12) United States Patent
Kimura

(10) Patent No.: US 10,425,543 B2
(45) Date of Patent: Sep. 24, 2019

(54) INFORMATION PROCESSING DEVICE, INFORMATION PROCESSING METHOD, AND COMPUTER-READABLE MEDIUM

(71) Applicant: Takayuki Kimura, Kanagawa (JP)

(72) Inventor: Takayuki Kimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/922,031

(22) Filed: Mar. 15, 2018

(65) Prior Publication Data

US 2018/0270371 A1 Sep. 20, 2018

(30) Foreign Application Priority Data

Mar. 16, 2017 (JP) .................................. 2017-051733

(51) Int. Cl.
*H04N 1/00* (2006.01)
*G06F 3/01* (2006.01)
*G06F 16/903* (2019.01)

(52) U.S. Cl.
CPC ........... *H04N 1/00352* (2013.01); *G06F 3/01* (2013.01); *G06F 16/903* (2019.01); *H04N 1/00122* (2013.01)

(58) Field of Classification Search
CPC ............ H04N 1/00352; H04N 1/00122; G06F 16/903; G06F 3/01

USPC ........................................................ 358/1.15
See application file for complete search history.

(56) References Cited

U.S. PATENT DOCUMENTS

2009/0019132 A1* 1/2009 Kamata .............. H04N 1/00222
709/217
2013/0254641 A1 9/2013 Kamata et al.

* cited by examiner

*Primary Examiner* — Saeid Ebrahimi Dehkordy
(74) *Attorney, Agent, or Firm* — Harness, Dickey & Pierce, P.L.C.

(57) ABSTRACT

An information processing device includes a first generator configured to generate screen definition information that defines an input screen for inputting bibliographic information used in flow definition information that defines a workflow; a control unit configured to perform control such that the input screen based on the screen definition information is displayed on a display unit of an image forming apparatus; a first acquisition unit configured to, when first bibliographic information that is input from the input screen is bibliographic information on which second bibliographic information different from the first bibliographic information depends, acquire the second bibliographic information that is associated with the first bibliographic information from association information; and a transmitter configured to transmit the second bibliographic information that is acquired by the first acquisition unit, to the image forming apparatus to display the second bibliographic information on the input screen.

20 Claims, 18 Drawing Sheets

FIG.7

FLOW DEFINITION DATA

```xml
<?xml version="1.0"?>
<Distribution>
    // Describe flow ID and bibliographic information used in this flow
    <ID>ContractFlow</ID>
    <LinkedPropertyScreen>ContractBibliography</LinkedPropertyScreen>
    // Describe image conversion process
    <Plugin>
        <PluginID>ImageConverter</PluginID>
        <PluginType>Filter</PluginType>
        <Parameters>
            <FileFormat>PDF</FileFormat>
        </Parameters>
        <Next>
            // Describe folder distribution process executed after image conversion process
            <Plugin>
                <PluginID>ToFolder</PluginID>
                <PluginType>Output</PluginType>
                <Parameters>
                    <FileName>Contract[num]_[cont]_[dep]</FileName>  ←―901
                    <Destinations>
                        <Path>\\111.111.111.111\Folder_1</Path>
                        <Path>\\111.111.111.111\Folder_2</Path>
                    </Destinations>
                </Parameters>
            </Plugin>
        </Next>
    </Plugin>
    // Describe E-mail process executed in parallel
    <Plugin>
        <PluginID>ToEmail</PluginID>
        <PluginType>Output</PluginType>
        <Parameters>
            <SmtpServer>111.111.111.111</SmtpServer>
            <Sender>abc@xxx.yyy.com</Sender>
            <Subject>Contract[num]</Subject>  ←―902
            <Body>Contract partner is [cont]</Body>  ←―903
            <FileName>Contract[num]_[cont]_[dep]</FileName>  ←―904
            <Destinations>
                <Address>dest1@xxx.yyy.com</Address>
                <Address>dest2@xxx.yyy.com</Address>
            </Destinations>
        </Parameters>
    </Plugin>
</Distribution>
```

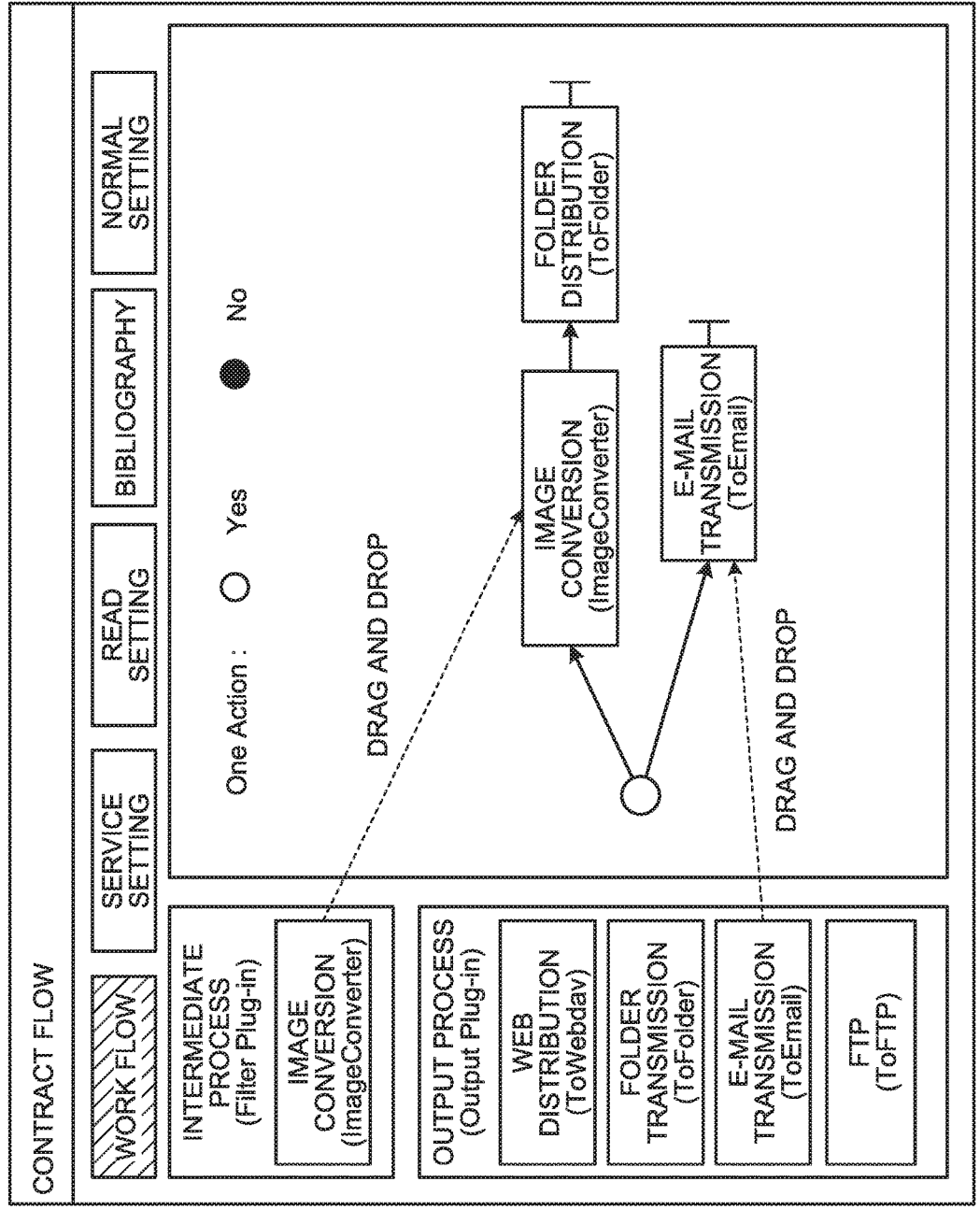

FIG.9

| E-MAIL TRANSMISSION SETTING |
|---|

| E-MAIL SYSTEM SETTING |
|---|

E-MAIL OPTION SETTING

| | |
|---|---|
| DEFAULT TRANSMISSION DESTINATION ADDRESS | |
| ATTACHED DOCUMENT TYPE | all |
| ATTACHED DOCUMENT NAME | Contract[num]_[cont]_[dep] |
| URL ATTACHMENT | ○ On  ● Off |
| MESSAGE BODY | Contract partner is [cont] |
| TRANSMIT TO YOUR ADDRESS | ○ On  ● Off |
| DEFAULT E-MAIL DOMAIN | |
| ERROR NOTIFICATION | ● NOTIFY TRANSMITTER |

| E-MAIL SEARCH SETTING |
|---|

FIG.10

SCREEN DEFINITION DATA

```
<?xml version="1.0"?>
<Screen>
   // ID of screen definition data
   <ID>ContractBibliography</ID>
   // BibliographicItem
   <Items>
      // Numeric-type
      <num Type="Numeric" IsEnabled="true" IsRequired="false"
           DisplayName="ContractNumber" MaxValue="100" MinValue="20"/>
      // CharacterString-type
      <cont Type="String" IsEnabled="true" IsRequired="false"
           DisplayName="ContractPartner" MaxLength="20" IsPassword="false"
           ValidationString="" />
   </Items>
</Screen>
```

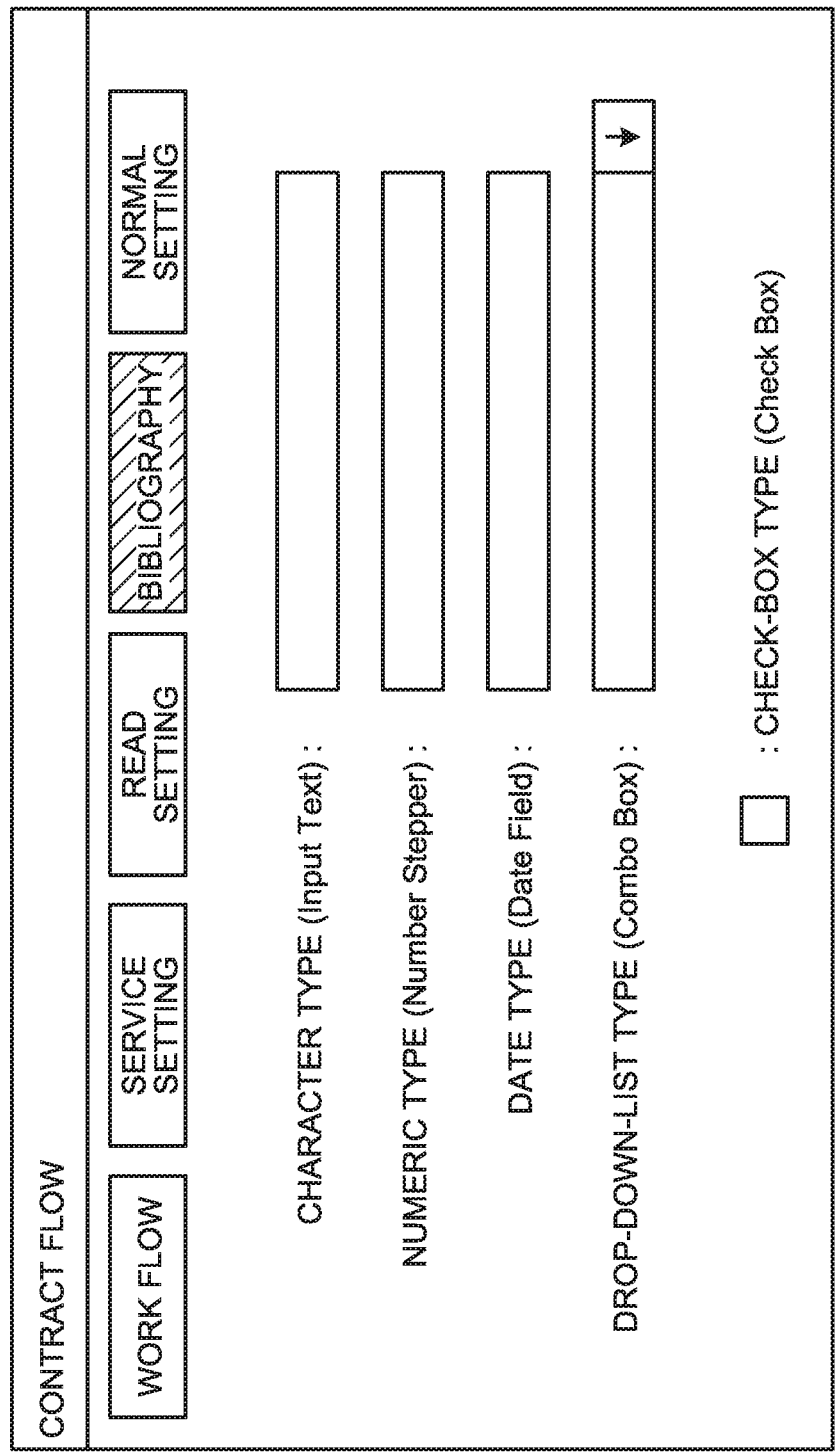

FIG.12

| ATTRIBUTE - CHARACTER TYPE |
|---|

NORMAL

EDITABLE  ○ False  ● True

INPUT NECESSARY  ○ True  ● False

DISPLAY NAME  [USER NAME]

TAG NAME  [user]

CHARACTER TYPE

MAXIMUM LENGTH  [20]

PASSWORD  ○ True  ● False

CHARACTER STRING TO BE VALIDATED  [          ]

[OK]  [CANCEL]

FIG.13

ATTRIBUTE - NUMERIC-VALUE TYPE

NORMAL

EDITABLE ○ False ● True

INPUT NECESSARY ○ True ● False

DISPLAY NAME | CONTRACT NUMBER

TAG NAME | num

NUMERIC-VALUE TYPE

MAXIMUM VALUE | 100

MINIMUM VALUE | 20

OK   CANCEL

FIG.14

```
ATTRIBUTE - DROP-DOWN-LIST TYPE

NORMAL
    ─────────────────────────────────────

EDITABLE      ○ False    ● True

INPUT NECESSARY   ● True     ○ False

DISPLAY NAME  [ DEPARTMENT NAME ]

TAG NAME      [ dep ]

DROP-DOWN-LIST TYPE
    ─────────────────────────────────────

CONNECTION
    PARTNER NAME      [ database1        ▽ ]

SQL QUERY         [ REFER TO ]   [ ···¥SQL.txt ]
                      [ UPLOAD ]
```

| USER NAME | EMPLOYEE CODE | DEPARTMENT NAME | EXTENSION | ... |
|---|---|---|---|---|
| SHIGERU AKAISHI | 0201 | DEVELOPMENT DEPARTMENT | 1630 | ... |
| KIYOMI IWANISHI | 0652 | GENERAL AFFAIR DEPARTMENT | 2154 | ... |
| TORU USAMI | 1013 | INDUSTRIAL TECHNOLOGY DEPARTMENT | 5598 | ... |
| ... | ... | ... | ... | ... |

FLOW SELECTION SCREEN

| XXX FLOW | YYY FLOW | CONTRACT FLOW |

| ZZZ FLOW |

FIG.19

CONTRACT BIBLIOGRAPHY

USER NAME      SHIGERU AKAISHI

DEPARTMENT NAME  ▽

CONTRACT NUMBER

CONTRACT PARTNER

FIG.20

| CONTRACT BIBLIOGRAPHY | |
|---|---|
| USER NAME | SHIGERU AKAISHI |
| DEPARTMENT NAME | DEVELOPMENT DEPARTMENT ▽ |
| CONTRACT NUMBER | 5 |
| CONTRACT PARTNER | XYZ |

FIG.21

```xml
<?xml version="1.0" encoding="UTF-8"?>
<document>
  <properties>
    <property id ="user">
      <value>ShigeruAkaishi</value>
    </property>
    <property id ="dep">
      <value>DevelopmentDepartment</value>
    </property>
    <property id ="num">
      <value>5</value>
    </property>
    <property id ="cont">
      <value>XYZ</value>
    </property>
  </properties>
</document>
```

FIG.22

FLOW DEFINITION DATA

```xml
<?xml version="1.0"?>
<Distribution>
    // Describe flow ID and bibliographic information used in this flow
    <ID>ContractFlow</ID>
    <LinkedPropertyScreen>ContractBibliography</LinkedPropertyScreen>
    // Describe image conversion process
    <Plugin>
        <PluginID>ImageConverter</PluginID>
        <PluginType>Filter</PluginType>
        <Parameters>
            <FileFormat>PDF</FileFormat>
        </Parameters>
        <Next>
            // Describe folder distribution process executed after image conversion process
            <Plugin>
                <PluginID>ToFolder</PluginID>
                <PluginType>Output</PluginType>
                <Parameters>
                    <FileName>Contract5_XYZ_DevelopmentDepartment</FileName>   ←—1601
                    <Destinations>
                        <Path>\\111.111.111.111\Folder_1</Path>
                        <Path>\\111.111.111.111\Folder_2</Path>
                    </Destinations>
                </Parameters>
            </Plugin>
        </Next>
    </Plugin>
    // Describe E-mail process executed in parallel
    <Plugin>
        <PluginID>ToEmail</PluginID>
        <PluginType>Output</PluginType>
        <Parameters>
            <SmtpServer>111.111.111.111</SmtpServer>
            <Sender>abc@xxx.yyy.com</Sender>
            <Subject>Contract5</Subject>   ←—1602
            <Body>Contract partner is XYZ</Body>   ←—1603
            <FileName>Contract5_XYZ_DevelopmentDepartment</FileName>   ←—1604
            <Destinations>
                <Address>dest1@xxx.yyy.com</Address>
                <Address>dest2@xxx.yyy.com</Address>
            </Destinations>
        </Parameters>
    </Plugin>
</Distribution>
```

INFORMATION PROCESSING DEVICE, INFORMATION PROCESSING METHOD, AND COMPUTER-READABLE MEDIUM

CROSS-REFERENCE TO RELATED APPLICATIONS

The present application claims priority under 35 U.S.C. § 119 to Japanese Patent Application No. 2017-051733, filed on Mar. 16, 2017. The contents of which are incorporated herein by reference in their entirety.

BACKGROUND OF THE INVENTION

1. Field of the Invention

The present invention relates to an information processing device, an information processing method and a computer-readable medium.

2. Description of the Related Art

Conventionally, there has been a system that distributes a document scanned with a multi-functional printer (MFP) and a technology enabling, with the distribution system, image processing performed on electronic data that is generated by scanning and enabling distribution of the electronic data to a specified distribution destination according to predetermined rules has been known. A MFP is a multi-function peripheral (that is an exemplary image forming apparatus) with at least two functions of a copy function, a printer function, a scanner function, and a facsimile function. The process (workflow) performed on the electronic data read by scanning is defined by flow definition data and it is possible to specify various combinations of internal processing methods in the flow definition data and, by defining a workflow according to the use, perform a process along the purpose of the user on the electronic data. Furthermore, it is possible to add any bibliographic information to the electronic data that is passed for the workflow, and a technology to perform various processes with reference to the bibliographic information in the workflow is already known.

A system that causes a display device of an image forming apparatus to display an input screen for setting bibliographic information in order to freely add bibliographic information to the workflow has been disclosed as the above-described distribution system (see Japanese Unexamined Patent Application Publication No. 2009-044723).

The technology described in Japanese Unexamined Patent Application Publication No. 2009-044723 makes it possible to freely set bibliographic information that the user uses in the workflow; however, there is a problem in that it is necessary to input multiple pieces of bibliographic information having dependence (relativeness) individually, which increases the workload of an operation of inputting bibliographic information.

SUMMARY OF THE INVENTION

According to an aspect of the present invention, an information processing device includes a first generator, a control unit, a first acquisition unit, and a transmitter. The first generator is configured to generate screen definition information that defines an input screen for inputting bibliographic information used in flow definition information that defines a workflow that is a flow of at least one process performed on image data. The control unit is configured to perform control such that the input screen based on the screen definition information is displayed on a display unit of an image forming apparatus. The first acquisition unit is configured to, when first bibliographic information that is input from the input screen displayed on the image forming apparatus is bibliographic information on which second bibliographic information different from the first bibliographic information depends, acquire the second bibliographic information that is associated with the first bibliographic information from association information in which the first bibliographic information and the second bibliographic information are associated with each other. The transmitter is configured to transmit the second bibliographic information that is acquired by the first acquisition unit, to the image forming apparatus to display the second bibliographic information on the input screen.

BRIEF DESCRIPTION OF THE DRAWINGS

FIG. 7 is a diagram illustrating exemplary content of the description of the flow definition data;

FIG. 8 is a diagram illustrating an exemplary flow definition data generation screen;

FIG. 9 is a diagram illustrating a process setting exemplary dialog box;

FIG. 10 is a diagram illustrating exemplary content of the description of the screen definition data;

FIG. 11 is a diagram illustrating an exemplary screen definition data generation screen;

FIG. 12 is a diagram illustrating an exemplary attribute setting dialog box for a character-type bibliographic information;

FIG. 13 is a diagram illustrating an exemplary attribute setting dialog box for a numeric-type bibliographic information item;

FIG. 14 is a diagram illustrating an exemplary attribute setting dialog box for a drop-down-list-type bibliographic information item;

FIG. 18 is a diagram illustrating an exemplary flow selection screen;

FIG. 19 is a diagram illustrating an exemplary mode where bibliographic information of the dependency destination is input on the bibliographic information input screen;

FIG. 20 is a diagram illustrating an exemplary mode where bibliographic information of the dependency source is input on the bibliographic information input screen;

FIG. 21 is a diagram illustrating exemplary input values of bibliographic information converted into the XML format; and FIG. 22 is a diagram illustrating exemplary content of the description of flow definition data in which input values of the bibliographic information are reflected.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
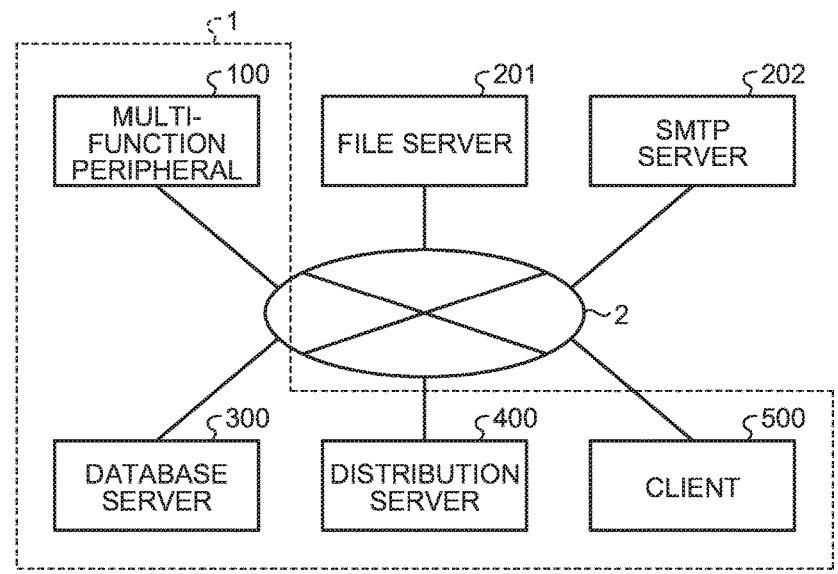
FIG. 1 is a diagram illustrating an exemplary network configuration including a distribution system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing device, an information processing method, and a computer-readable medium enabling reduction of the workload of an operation of inputting bibliographic information that is used in a workflow.

With reference to FIGS. 1 to 22, embodiments of the information processing device, the information processing system, the information processing method, and the program according to the present invention will be described in detail below. The following embodiments do not limit the invention and the components of the following embodiments include those reached easily by those skilled in the art, those substantially the same, and those within the range of equality. Furthermore, it is possible to implement various types of omission, replacement, modification and combination of components within the scope of the following embodiments.

Network Configuration Including Distribution System

FIG. 1 is a diagram illustrating an exemplary network configuration including a distribution system according to an embodiment. With reference to FIG. 1, a network configuration including a distribution system 1 according to the embodiment will be described.

As illustrated in FIG. 1, the network configuration of the embodiment includes a multi-function peripheral 100, a file server 201, a simple mail transfer protocol (SMTP) server 202, a database server 300, a distribution server 400 and a client 500. The distribution system 1 according to the embodiment is configured such that the multi-function peripheral 100, the file server 201, the SMTP server 202, the database server 300, the distribution server 400 and the client 500 are able to communicate with one another via a network 2. The network 2 is, for example, a local area network (LAN) or the Internet. The network 2 may include multiple networks or may include both wired and wireless networks.

As described above, the multi-function peripheral 100 is an image forming apparatus having at least two functions of the copy function, the printer function, the scanner function and the facsimile function. The multi-function peripheral 100 scans a paper medium or the like by the scanner function, generates image data, and transmits the generated image data to the distribution server 400. The distribution system 1 illustrated in FIG. 1 includes the single multi-function peripheral 100; however, the embodiments are not limited thereto and the distribution system 1 may include multiple multi-function peripherals. Furthermore, the multi-function peripheral 100 is exemplified as the image forming apparatus that inputs (forms) image data; however, the embodiments are not limited thereto and an image forming apparatus, such as a scanner device, a facsimile device or a copy device, is usable as long as the image forming apparatus is able to input (form) image data.

The file server 201 is a server device that accumulates and manages files shared on the network 2. The SMTP server 202 is a server device for transmitting electronic mails according to SMTP that is a mail transmission protocol. Both the file server 201 and the SMTP server 202 are accessed because of a distribution process performed by the distribution server 400. The file server 201 and the SMTP server 202 include, for example, a work station. The destination of distribution of the distribution process performed by the distribution server 400 is not limited to the file server 201 and the SMTP server 202 and, for example, another information device, such as a mail server or another information device, such as the multi-function peripheral 100, may be accessed because of the distribution process.

The database server 300 is a server device having, as a database, information that associates pieces of bibliographic information that is input to the bibliographic information input screen (input screen) that is displayed on the multi-function peripheral 100, which will be described below. The database server 300 includes, for example, a work station.

The distribution server 400 is a server device (information processing device) that receives image data obtained by scanning by the multi-function peripheral 100 and executes various processes and the distribution process according to flow definition data (flow definition information), which will be described below. The distribution server 400 includes, for example, a work station.

The client 500 is a terminal device for making operational inputs to generate the flow definition data and image definition data of the distribution server 400, etc., by using a function of generating the flow definition data and the image definition data. The client 500 includes, for example, a personal computer (PC).

In the distribution system 1, the distribution server 400 or a program to implement the process executed by the distribution server 400, which will be described below, is provided by a producer of the multi-function peripheral 100 or a producer of a related product using the multi-function peripheral 100. Furthermore, the database server 300 need not be prepared as one under the direct control of the distribution server 400. In other words, the database server 300 need not be provided by the provider of the distribution server 400 or of the product related to the multi-function peripheral 100 and, for example, one that a party that introduces the multi-function peripheral 100 or the distribution server 400 possesses in advance may be used or a new one may be prepared. Accordingly, a given condition or limitation may be imposed on the distribution server 400 to use the database server 300 of the distribution system 1; however, for example, it does not mean that the database structure, etc., are defined in detail by the party who provides the distribution server 400. It suffices if the party that introduces the distribution system 1 properly determines which kind of the database server 300 is prepared and which configuration the database has and, in that sense, the distribution server 400 according to the embodiment is able to use the general-purpose database server 300.

Hardware Configuration of Distribution Server

Figure 2:
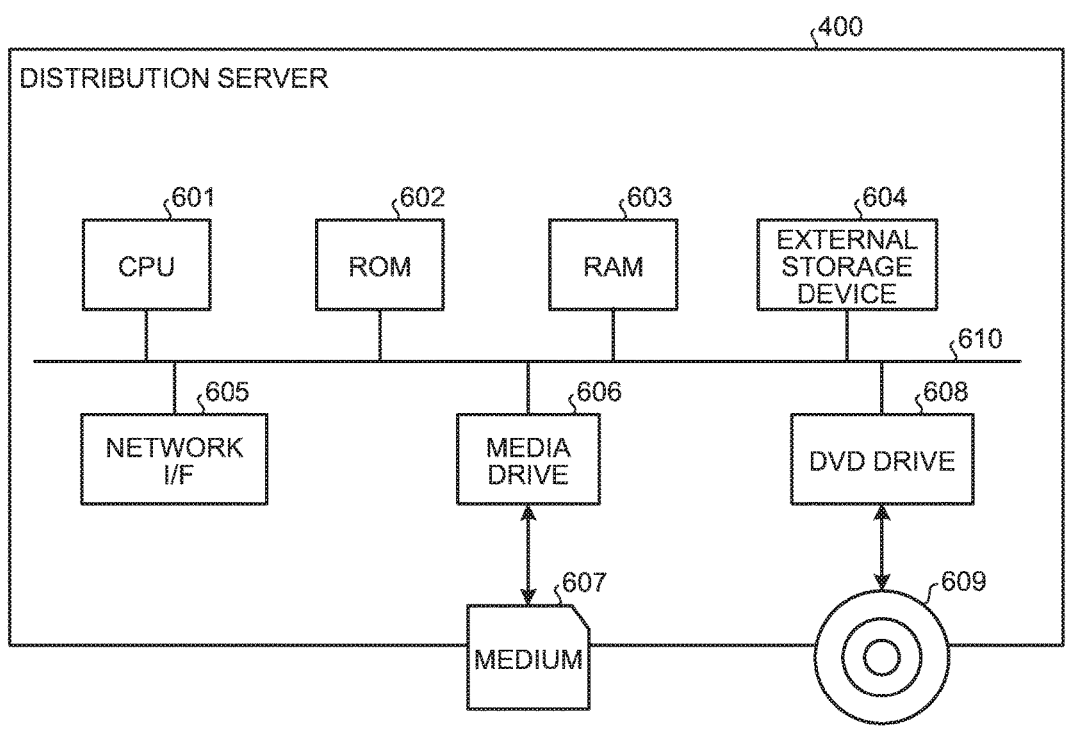
FIG. 2 is a diagram illustrating an exemplary hardware configuration of a distribution server according to the embodiment.

FIG. 2 is a diagram illustrating an exemplary hardware configuration of the distribution server according to the embodiment. With reference to FIG. 2, details of the hardware configuration of the distribution server 400 according to the embodiment will be described.

As illustrated in FIG. 2, the distribution server 400 according to the embodiment includes a central processing unit (CPU) 601, a read only memory (ROM) 602, a random access memory (RAM) 603, an external storage device 604, a network I/F 605, a media drive 606, and a digital versatile disc (DVD) drive 608.

The CPU 601 is an arithmetic device that controls entire operations of the distribution server 400. The ROM 602 is a non-volatile storage device that stores a program (such as a basic input/output system (BIOS)) for the distribution server 400. The RAM 603 is a non-volatile storage device that is used as a work area of the CPU 601.

The external storage device 604 is, as described below, a non-volatile storage device that stores various types of data, such as image data that is received from the multi-function peripheral 100, the flow definition data, and the image definition data. The external storage device 604 is, for example, a hard disk drive (HDD) or a solid state drive (SSD).

The network I/F 605 is an interface for communicating data by using the network 2. The network I/F 605 is, for example, a network interface card (NIC) corresponding to TCP (Transmission Control Protocol)/IP (Internet Protocol).

The media drive 606 is a device that controls reading and writing data from and in a medium 607, such as a flash memory, under the control of the CPU 601. The medium 607 is a storage device that is detachable from the media drive 606. The medium 607 is not limited to a flash memory as long as the medium 607 is a non-volatile memory from which and in which data is read and written under the control of the CPU 601 and, for example, an electronically erasable and programmable ROM (EEPROM) may be used.

The DVD drive 608 is a device that controls reading and writing data from and in a digital versatile disc read only memory (DVD-ROM) 609 that is an exemplary detachable storage medium. For example, the detachable recording medium may be a computer-readable recording medium, such as a compact disc read only memory (CD-ROM), a compact disc recordable (CD-R), a digital versatile disc recordable (DVD-R) or a Blu-ray disc.

The above-described CPU 601, the ROM 602, the RAM 603, the external storage device 604, the network I/F 605, the media drive 606 and the DVD drive 608 are connected such that they are able to communicate with one another via a bus 610, such as an address bus and a data bus.

The program of the distribution server 400 may be recorded in an installable format or an executable format in a computer-readable recording medium (such as the medium 607 or the DVD-ROM 609) and distributed. The above-described program of the distribution server 400 may be stored not in the medium 607 or the DVD-ROM 609 but in the ROM 602 or the external storage device 604.

The configuration of the distribution server 400 illustrated in FIG. 2 is an example and the distribution server 400 need not include all component devices and may include another component device. For example, if the DVD drive 608 is able to substitute for the media drive 606, the distribution server 400 need not include the media drive 606. Furthermore, if a manager directly makes operational inputs to the distribution server 400, the distribution server 400 may include an operating device, such as a mouse and a keyboard, and a display device (display) for displaying results of inputs made by the operation device.

The hardware configuration of the database server 300 accords with the hardware configuration of the distribution server 400 illustrated in FIG. 2.

Hardware Configuration of Client

Figure 3:
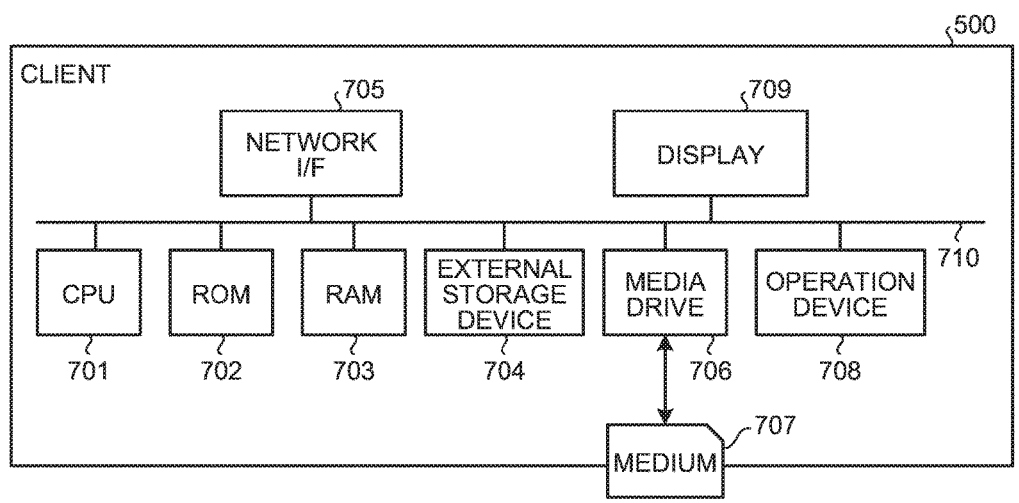
FIG. 3 is a diagram illustrating an exemplary hardware configuration of a client according to the embodiment.

FIG. 3 is a diagram illustrating an exemplary hardware configuration of a client according to the embodiment. With reference to FIG. 3, details of the hardware configuration of the client 500 according to the embodiment will be described.

As illustrated in FIG. 3, the client 500 according to the embodiment includes a CPU 701, a ROM 702, a RAM 703, an external storage device 704, a network I/F 705, a media drive 706, an operation device 708 and a display 709.

The CPU 701 is an arithmetic device that controls entire operations of the client 500. The ROM 702 is a non-volatile storage device that stores a program (such as a BIOS) for the client 500. The RAM 703 is a non-volatile storage device that is used as a work area of the CPU 701.

The external storage device 704 is a non-volatile storage device that stores various types of data, such as a file that defines a query by using a SQL sentence (which may be referred to as a "query file" below), which will be described below. The external storage device 704 is, for example, a HDD or a SSD.

The network I/F 705 is an interface for communicating data by using the network 2. The network I/F 705 is, for example, an NIC corresponding to TCP/IP.

The media drive 706 is a device that controls reading and writing data from and in the medium 707, such as a flash memory, under the control of the CPU 701. The medium 707 is a storage device detachable from the media drive 706. The medium 707 is not limited to a flash memory as long as the memory is a non-volatile memory from which and in which data is read and written under the control of the CPU 701 and a EEPROM, or the like, may be used.

The operation device 708 is an input device to input characters, numbers, etc., select various instructions, and move a cursor. The operation device 708 is, for example, a mouse or a keyboard.

The display 709 is a display device that displays characters, numbers, various screens, and icons for operation. The display 709 is, for example, a cathode ray tube (CRT) display, a liquid crystal display (LCD), or an organic electroluminescence (EL) display.

The CPU 701, the ROM 702, the RAM 703, the external storage device 704, the network I/F 705, the media drive 706, the operation device 708 and the display 709 are connected such that they are able to communicate with one another via a bus 710, such as an address bus and a data bus.

A program of the above-described client 500 may be recorded in a file in an installable format or an executable format in a computer-readable recording medium (such as the medium 707) and distributed. The program of the above-described client 500 may be stored not in the medium 707 but in the ROM 702 or the external storage device 704.

The configuration of the client 500 illustrated in FIG. 3 is an example and need not include all component devices and the client 500 may include another component device.

Hardware Configuration of Multi-Function Peripheral

Figure 4:
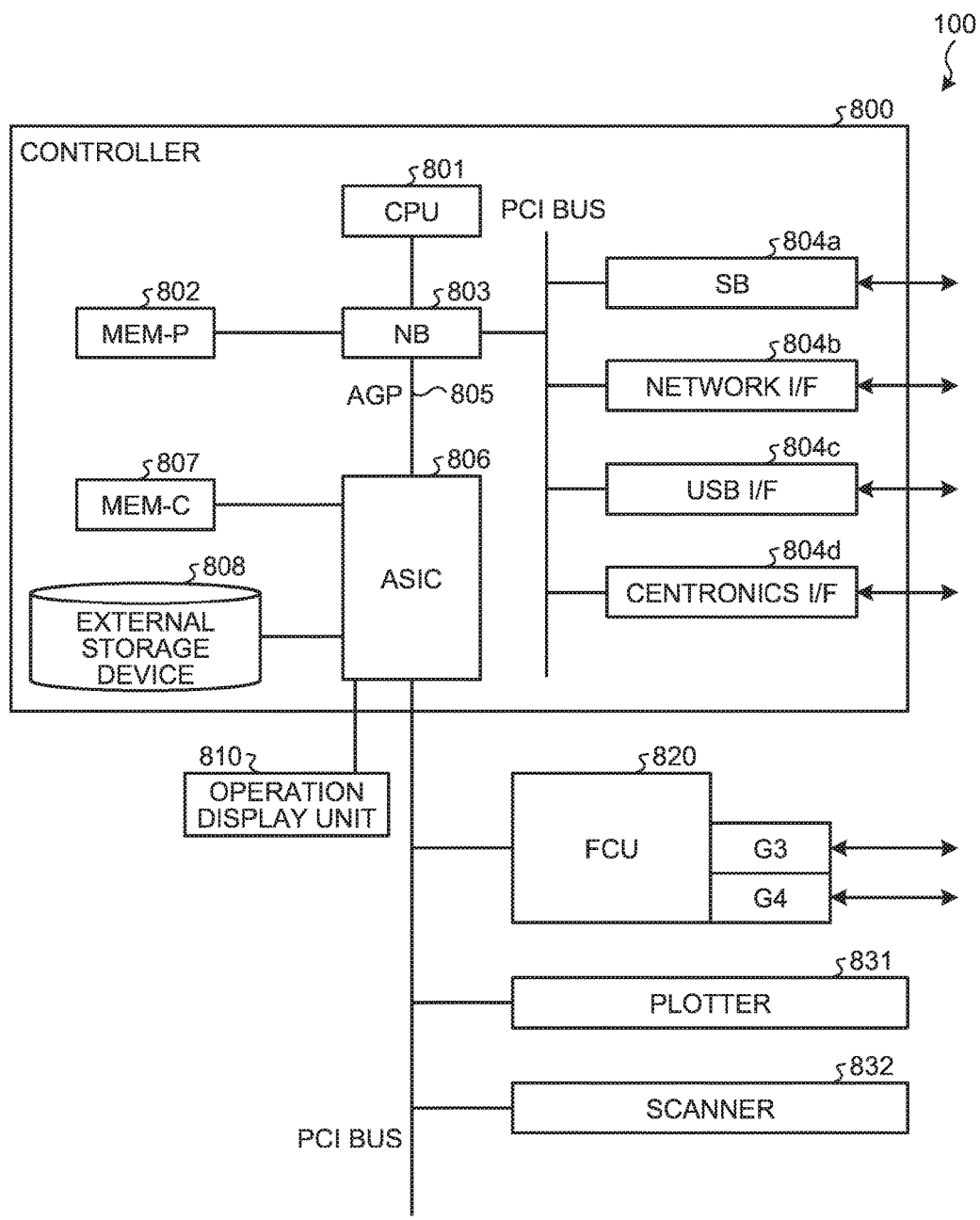
FIG. 4 is a diagram illustrating an exemplary hardware configuration of a multi-function peripheral according to the embodiment.

FIG. 4 is a diagram illustrating an exemplary hardware configuration of the multi-function peripheral according to the embodiment. With reference to FIG. 4, details of the hardware configuration of the multi-function peripheral 100 according to the embodiment will be described.

As illustrated in FIG. 4, the multi-function peripheral 100 according to the embodiment has a configuration in which a controller 800, an operation display unit 810, a facsimile control unit (FCU) 820, a plotter 831 and a scanner 832 are connected with one another via a peripheral component interface (PCI) bus.

The controller 800 is a device that controls the whole multi-function peripheral 100 and controls drawing, communication and inputs from the operation display unit 810.

The operation display unit 810 is, for example, a touch panel and is a device that receives inputs to the controller 800 (operation function) and displays the mode of the multi-function peripheral 100 (display function). The operation display unit 810 is directly connected to an application specific integrated circuit (ASIC) 806.

A FCU 820 is a device that realizes the facsimile function and is connected to the ASIC 806 via a PCI bus.

The plotter 831 is a device that realizes the printing function and is connected to the ASIC 806 via the PCI bus. The scanner 832 is a function that realizes the scanner function and is connected to the ASIC 806 via the PCI bus.

The controller 800 includes a CPU 801, a system memory (MEM-P) 802, a north bridge (NB) 803, a south bridge (SB) 804*a*, a network I/F 804*b*, a universal serial bus (USB) I/F 804*c*, a Centronics I/F 804*d*, the ASIC 806, a local memory (MEM-C) 807, and an external storage device 808.

The CPU 801 controls the whole multi-function peripheral 100 and is connected to a chip set including the system memory 802, the north bridge 803 and the south bridge 804*a* and is connected to another device via the chip set.

The system memory 802 is a memory that is used as a memory for storing a program and data, a memory for loading the program and data, and a memory for drawing by the printer. The system memory 802 includes a ROM and a RAM. The ROM is a memory dedicated to reading and used as a memory for storing the program and data and the RAM is a writable and readable memory that is used as a memory dedicated to reading and used as a memory for loading the program and data and as a memory for drawing by the printer.

The north bridge 803 is a bridge for connecting the CPU 801, the system memory 802, the south bridge 804*a* and an accelerated graphics port (AGP) bus 805. The north bridge 803 includes a memory controller that controls writing in the system memory 802, a PCI master and an AGP target.

The south bridge 804*a* is a bridge for connecting the north bridge 803 with PCI devices and peripheral devices. The south bridge 804*a* is connected to the north bridge 803 via the PCI bus and a network I/F 804*b*, the USB I/F 804*c* and the Centronics I/F 804*d*, etc., are connected to the PCI bus.

The AGP bus 805 is a bus interface for a graphics accelerator card that is proposed to accelerate graphic processing. The AGP bus 805 is a bus that enables the graphics accelerator card to accelerate by directly accessing the system memory 802 at a high throughput.

The ASIC 806 is an integrated circuit (IC) for image processing that includes hardware components for image processing. The ASIC 806 servers as a bridge that connects the AGP bus 805, the PCI bus, the external storage device 808 and the local memory 807 with one another. The ASIC 806 includes a PCI target, an AGP master, an arbiter (ARB) serving as the center core of the ASIC 806, a memory controller that controls the local memory 807, multiple direct memory access controllers (DMAC) that, for example, rotate image data according to a hardware logic, or the like, and a PCI unit that transfers data via the PCI bus between the plotter 831 and the scanner 832. The FCU 820, the plotter 831, and the scanner 832 are connected to the ASIC 806 via the PCI bus. The ASIC 806 is connected to the host PC (not shown), the network, etc.

The local memory 807 is a memory that is used as a copy image buffer and a code buffer.

The external storage device 808 is a storage device, such as a HDD, a SSD, a SD card or a flash memory, and is storage for accumulating image data, accumulating programs, accumulating font data and accumulating forms.

A program of the above-described multi-function peripheral 100 may be recorded in a file in an installable format or an executable format in a computer-readable recording medium (such as the external storage device 808) and distributed.

The configuration of the multi-function peripheral 100 illustrated in FIG. 4 is an example and need not include all component devices and the multi-function peripheral 100 may include another component devices.

Functional Block Configurations of Distribution System

Figure 5:
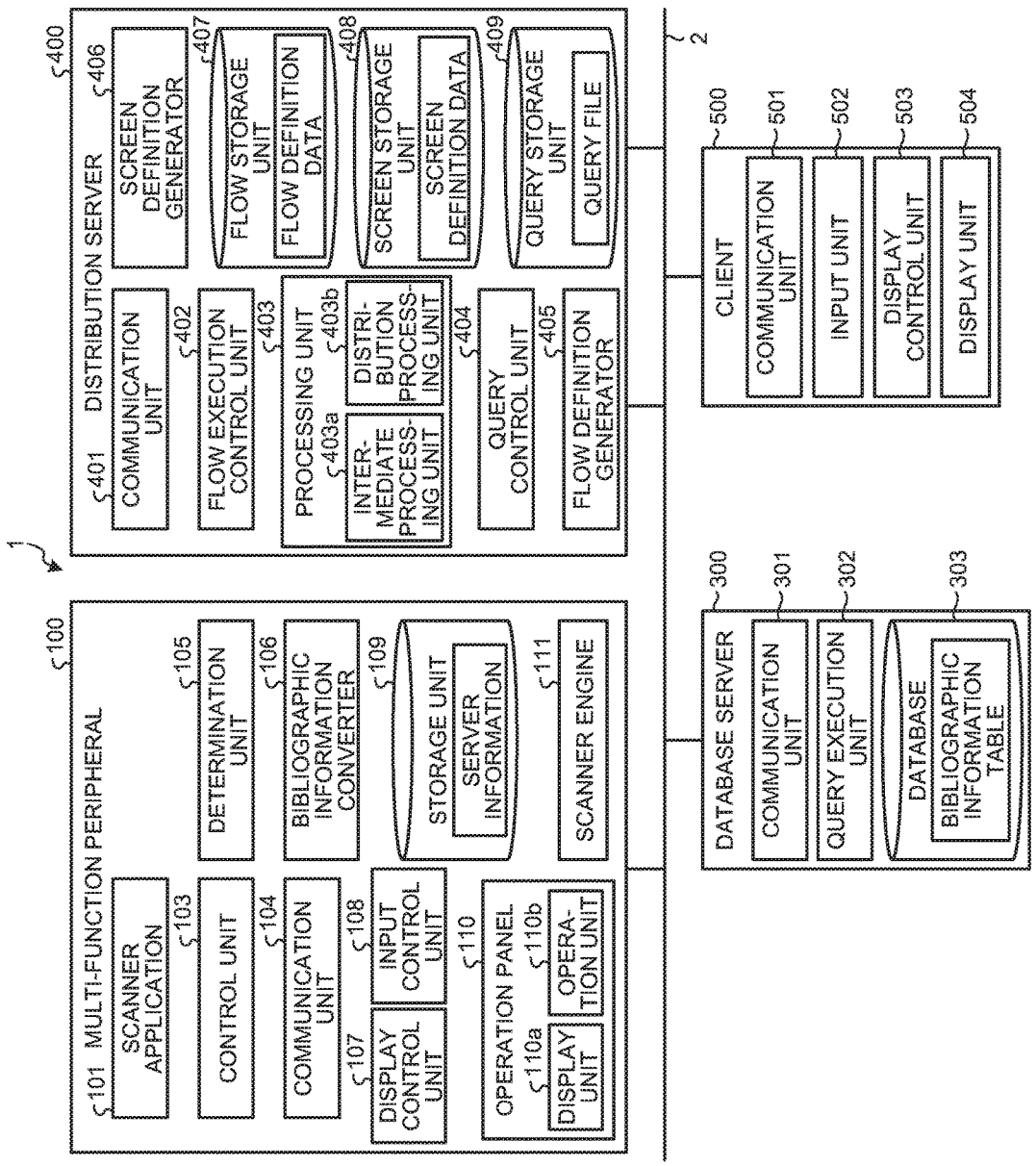
FIG. 5 is a diagram illustrating an exemplary configuration of a functional block of the distribution system according to the embodiment.

FIG. 5 is a diagram illustrating exemplary configurations of the functional blocks of the distribution system according to the embodiment. With reference to FIG. 5, the functional block configurations of the multi-function peripheral 100, the database server 300, the distribution server 400, and the client 500 of the distribution system 1 will be described.

Functional Block Configuration of Multi-Function Peripheral

As illustrated in FIG. 5, the multi-function peripheral 100 of the distribution system 1 includes a scanner application 101, a control unit 103, a communication unit 104, a determination unit 105, a bibliographic information converter 106, a display control unit 107, an input control unit 108, a storage unit 109, an operation panel 110, and a scanner engine 111.

The scanner application 101 is an application that executes a scanning condition setting and a scanning process according to operations performed by a user on a operation unit 110*b* (such as a scanning button) of the operation panel 110, which will be described below. Specifically, the scanner application 101 makes a scanning request to the control unit 103 and causes the scanner engine 111 to operate to scan an original. The scanner application 101 inputs image data of the scanned original. When the scanning process starts, that is, when the input control unit 108 senses that the user presses the scanning button, the scanner application 101 instructs the communication unit 104 to transmit a request for a flow selection screen to the distribution server 400 in order to select a workflow. In order to display the bibliographic information input screen on a display unit 110*a* of the operation panel 110, which will be described below, the scanner application 101 instructs the distribution server 400 to transmit information about the bibliographic information input screen based on screen definition data (described below) via the communication unit 104.

In the example illustrated in FIG. 5, only the scanner application 101 is represented as the application; however, in the multi-function peripheral 100, a copy application to perform a copy process, a printer application to perform a printing process, a facsimile application to perform a facsimile transmitting and receiving process, etc., run as other applications.

The control unit 103 is a functional unit that receives a request from an application, such as the scanner application 101, and controls operations of the scanner engine 111 and other devices.

The communication unit 104 is a functional unit that controls transmission and reception of various types of data to and from the distribution server 400. Specifically, the communication unit 104 transmits a request for the flow selection screen (described below), a flow ID of a selected workflow, bibliographic information that is input on the bibliographic information input screen (described below), image data that is scanned, etc., to the distribution server 400 according to the IP address represented by the server information that is stored in the storage unit 109. Furthermore, with respect to the flow selection screen, the bibliographic information input screen and the bibliographic information for which a query is set on the bibliographic information input screen, the communication unit 104 receives information (extracted values) that is extracted by execution of the query, etc., from the distribution server 400. The communication unit 104 is realized by the network I/F 804b represented in FIG. 4.

The determination unit 105 is a functional unit that determines whether bibliographic information that is input on the bibliographic information input screen is bibliographic information on which the query depends. In other words, when the input bibliographic information is contained as a tag in a query (SQL sentence) that is set in the item of other bibliographic information (bibliographic information of the dependency source), the determination unit 105 determines that the input bibliographic information is bibliographic information on which the query depends.

The bibliographic information converter 106 is a functional unit that converts the bibliographic information that is input on the bibliographic information input screen and other bibliographic information (for example, attribute information of scanned image data) into data in the extensible markup language (XML) format.

The display control unit 107 is a functional unit that controls various screens and information display operations of the display unit 110a of the operation panel 110. For example, the display control unit 107 causes the display unit 110a to display the bibliographic information input screen that is received by the communication unit 104 from the distribution server 400.

The input control unit 108 is a functional unit that receives operational inputs, such as touch and software-key inputs, on the operation unit 110b of the operation panel 110 and controls the inputs.

The storage unit 109 is a functional unit that stores server information containing the IP address of the distribution server 400, etc. The storage unit 109 is realized by the external storage device 808 illustrated in FIG. 4.

The operation panel 110 is a touch panel enabling display of various screens to the user and operational inputs by touch operations. The operation panel 110 is realized by the operation display unit 810 illustrated in FIG. 4. The operation panel 110 includes the display unit 110a and the operation unit 110b.

The display unit 110a is a functional unit that performs operations of displaying various screens and information under the control of the display control unit 107. The display unit 110a is realized by the display function serving as a touch panel of the operation panel 110.

The operation unit 110b is a functional unit that receives operational inputs, such as touch and software-key inputs. The operation unit 110b is realized by a touch input function serving as a touch panel of the operation panel 110. The operation panel 110 may have hardware switches in addition to the operation unit 110b that is realized by the touch input function of the touch panel.

The scanner engine 111 is a functional unit that executes scanning operations. The scanner engine 111 is realized by the scanner 832 represented in FIG. 4.

The scanner application 101, the control unit 103, the determination unit 105, the bibliographic information converter 106, the display control unit 107 and the input control unit 108 are, for example, realized by the CPU 801 represented in FIG. 4 by executing a program. Part of or all the scanner application 101, the control unit 103, the determination unit 105, the bibliographic information converter 106, the display control unit 107 and the input control unit 108 may be realized not by a program that is software but a hardware circuit, such as the ASIC 806.

The scanner application 101, the control unit 103, the communication unit 104, the determination unit 105, the bibliographic information converter 106, the display control unit 107, the input control unit 108, the storage unit 109, the operation panel 110 and the scanner engine 111 of the multi-function peripheral 100 illustrated in FIG. 5 correspond to functions that are represented schematically and the embodiments are not limited to such a configuration. For example, the multiple functional units illustrated as independent functional units in the multi-function peripheral 100 illustrated in FIG. 5 may be configured as a single functional unit. On the other hand, the function of a single functional unit of the multi-function peripheral 100 illustrated in FIG. 5 may be divided into multiple functions and the functions may be configured as multiple functional units.

Functional Block Configuration of Database Server

The database server 300 of the distribution system 1 includes, as illustrated in FIG. 5, a communication unit 301, a query execution unit 302 and a database 303.

The communication unit 301 is a functional unit that controls transmission and reception of various types of data to and from the distribution server 400. Specifically, the communication unit 301 receives a query (SQL sentence) that is generated by the distribution server 400. The communication unit 301 transmits bibliographic information (extracted value) that is extracted by executing the query to the distribution server 400. The communication unit 301 is realized by the network I/F 605 illustrated in FIG. 2.

The query execution unit 302 is a functional unit that executes the query (SQL sentence) that is received by the communication unit 301 and extracts bibliographic information from a bibliographic information table (for example, from an employee table 1000 illustrated in FIG. 16) that is stored in the database 303.

The database 303 is a functional unit that stores the bibliographic information table. The database 303 is realized by the external storage device 604 represented in FIG. 2.

The query execution unit 302 is realized by the CPU 601 represented in FIG. 2 by executing the program. The query execution unit 302 may be realized not by a program that is software but by a hardware circuit, such as an ASIC or a field-programmable gate array (FPGA).

The functions of the communication unit 301, the query execution unit 302, and the database 303 of the database server 300 illustrated in FIG. 5 are schematically represented and the embodiments are not limited thereto. For example, multiple functional units that are represented as independent functional units in the database server 300 illustrated in FIG. 5 may be configured as a single functional unit. On the other hand, the function of a single functional unit of the database server 300 illustrated in FIG. 5 may be divided into multiple functions and the functions may be configured as multiple functional units.

Functional Block Configuration of Distribution Server

The distribution server 400 of the distribution system 1 includes, as illustrated in FIG. 5, a communication unit 401 (a first acquisition unit, an acquisition unit, a transmitter and a second acquisition unit), a flow execution control unit 402 (a control unit and an merging unit), a processing unit 403, a query control unit 404, a flow definition generator 405, a screen definition generator 406 (a first generator and a generator), a flow storage unit 407 (a second generator), a screen storage unit 408 and a query storage unit 409.

The communication unit 401 is a functional unit that controls transmission and reception of various types of data to and from the multi-function peripheral 100. Specifically, the communication unit 401 transmits, to the multi-function peripheral 100, the flow selection screen, the bibliographic information input screen, information (an extracted value) about bibliographic information for which the query is set on the bibliographic information input screen, which is the information extracted by executing the query, etc. The communication unit 401 receives a request for the flow selection screen, a flow ID of the selected workflow, bibliographic information that is input on the bibliographic information input screen, scanned image data, etc., from the multi-function peripheral 100. The communication unit 401 is realized by the network I/F 605 represented in FIG. 2.

The flow execution control unit 402 is a functional unit that reads the flow definition data from the flow storage unit 407 and controls the processing unit 403 in executing various processes that are defined by the flow definition data. The flow execution control unit 402 sets the bibliographic information that is received by the communication unit 401 from the multi-function peripheral 100 in the flow definition data to associate the bibliographic information and the flow definition data and controls execution of various processes on the image data according to the flow definition data with which the bibliographic information is associated. The flow definition data is data that defines, in the XML format, the flow (workflow) of various processes performed on the image data that is input by scanning by the multi-function peripheral 100 and received from the multi-function peripheral 100.

The processing unit 403 is a functional unit that executes various processes that are defined in the flow definition data. The processing unit 403 includes an intermediate processing unit 403a and a distribution processing unit 403b.

The intermediate processing unit 403a is a functional unit that executes an intermediate process, such as an image conversion process to convert image data into image data in a given format. The distribution processing unit 403b is a functional unit that executes a distribution process to distribute image data to the multi-function peripheral 100 or the file server 201 and an output process, such as an e-mail transmission process to transmit an email attached with image data to the SMTP server 202.

The query control unit 404 is a functional unit that generates a query (SQL sentence) by using the bibliographic information that is input as one on which the query depends on the bibliographic information input screen, which is displayed on the multi-function peripheral 100, and the query file that is stored in advance in the query storage unit 409 and causes the database server 300 to execute the query.

The flow definition generator 405 is a functional unit that generates or edits the flow definition data according to an operation instruction of the manager to the client 500 and stores the generated or edited flow definition data in the flow storage unit 407. The flow definition data generation process performed by the flow definition generator 405 will be described below.

The screen definition generator 406 is a functional unit that generates or edits screen definition data according to an operation instruction of the manager to the client 500 and stores the generated or edited screen definition data in the screen storage unit 408. The screen definition data is data that defines, in the XML format, the bibliographic information input screen to display the bibliographic information for the workflow on the display unit 110a of the operation panel 110 of the multi-function peripheral 100. The screen definition data is associated with the flow definition data that defines the workflow to which the bibliographic information, which is input on the bibliographic information input screen defined by the screen definition data, is assigned. The screen definition data generation process performed by the screen definition generator 406 will be described below.

The flow storage unit 407 is a functional unit that stores flow definition data that is generated by the flow definition generator 405. The flow storage unit 407 is realized by the external storage device 604 illustrated in FIG. 2.

The screen storage unit 408 is a functional unit that stores screen definition data that is generated by the screen definition generator 406. The screen storage unit 408 is realized by the external storage device 604 represented in FIG. 2.

The query storage unit 409 is a storage unit that stores a query file that defines a query (SQL sentence) that is uploaded by an operation on an attribute setting dialog box of the screen definition data generation screen that is displayed on the client 500, which will be described below. The query storage unit 409 is realized by the external storage device 604 represented in FIG. 2.

The flow execution control unit 402, the processing unit 403, the query control unit 404, the flow definition generator 405, and the screen definition generator 406 are realized by the CPU 601 represented in FIG. 2 by executing the program. Parr of or all the flow execution control unit 402, the processing unit 403, the query control unit 404, the flow definition generator 405, and the screen definition generator 406 may be realized not by a program that is software but by a hardware circuit, such as the ASIC 806.

The communication unit 401, the flow execution control unit 402, the processing unit 403, the query control unit 404, the flow definition generator 405, the screen definition generator 406, the flow storage unit 407, the screen storage unit 408 and the query storage unit 409 correspond to functions that are represented schematically and the embodiments are not limited to such a configuration. For example, multiple functional units that are represented in FIG. 5 as independent functional units in the distribution server 400 illustrated in FIG. 5 may be configured as a single functional unit. On the other hand, the function of a single functional unit of the distribution server 400 represented in FIG. 5 may be divided into multiple functions and the multiple functions may be configured as multiple functional units.

Functional Block Configuration of Client

The client 500 of the distribution system 1 includes, as illustrated in FIG. 5, a communication unit 501, an input unit 502, a display control unit 503, and a display unit 504.

The communication unit 501 is a functional unit that controls transmission and reception of various types of data to and from the distribution server 400. Specifically, the communication unit 501 receives a flow definition data generation screen, which will be described below, the screen definition data generation screen, etc., from the distribution server 400. The communication unit 501 transmits information that is set on the flow definition data generation screen and the screen definition data generation screen to the distribution server 400.

The input unit 502 is a functional unit that receives various operational inputs made by the manager. The input unit 502 is realized by the operation device 708 represented in FIG. 3.

The display control unit 503 is a functional unit that controls operations of the display unit 504 to display various types of screens and information. The display control unit 503 is realized by the CPU 701 represented in FIG. 3 by executing the program. The display control unit 503 may be realized not by a program that is software but by a hardware circuit, such as the ASIC or the FPGA.

The display unit 504 is a functional unit that performs operations of displaying various types of screens and information under the control of the display control unit 503. The display unit 504 is realized by the display 709 represented in FIG. 3.

The communication unit 501, the input unit 502, the display control unit 503, and the display unit 504 of the client 500 illustrated in FIG. 5 correspond to functions that are schematically represented and the embodiments are not limited to such a configuration. For example, multiple functional units represented in FIG. 5 as independent functional units in the client 500 illustrated in FIG. 5 may be configured as a single functional unit. On the other hand, the function of a single functional unit of the client 500 represented in FIG. 5 may be divided into multiple functions and the multiple functions may be configured as multiple functional units.

Flow Definition Data Generation Process

Figure 6:
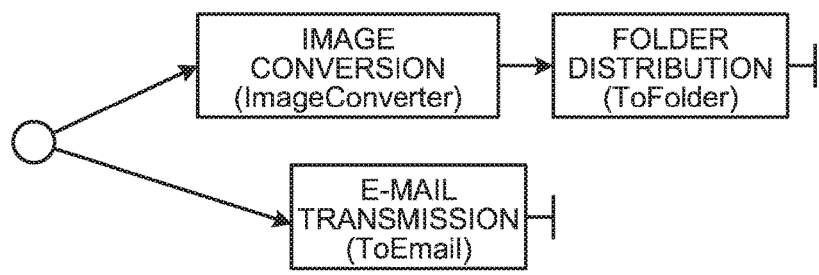
FIG. 6 is a diagram schematically illustrating an exemplary flow of a process that is defined in a flow definition data.

FIG. 6 is a diagram schematically illustrating an exemplary flow of the process that is defined in the flow definition data. FIG. 7 is a diagram illustrating exemplary content of the description of the flow definition data. FIG. 8 is a diagram illustrating an exemplary flow definition data generation screen. FIG. 9 is a diagram illustrating an exemplary process setting dialog box. With reference to FIGS. 6 to 9, the flow definition data generation process will be described.

First of all, the workflow that is defined by the flow definition data will be described. The workflow represents a flow of at least one process executed on image data that that is input by scanning by the multi-function peripheral 100. The processes include an output process that is an image data distribution process and an intermediate process that is executed at a stage prior to the output process. In the flow definition data that defines the workflow, the flow of a series of processes in which at least one intermediate process executed by the distribution server 400 and at least one output process are combined sequentially, or the flow of a series of processes in which at least one output process is combined sequentially, is described. The flow definition data may be defined such that such a flow of a series of processes is executed in parallel.

With reference to FIG. 6, a specific example of a flow of processes in a workflow will be described. FIG. 6 illustrates an exemplary contract flow that is a workflow about the process of distributing image data obtained by scanning a contract. In the contract flow, a flow in which the image conversion process performed on the image data of the scanned contract and the process of distributing the image data on which the image conversion is performed to a folder are executed sequentially and a flow of an e-mail transmission process to transmit the scanned-image data by e-mail are executed in parallel.

With reference to FIG. 7, specific description content of flow definition data that defines the contract flow illustrated in FIG. 6 will be described. As described above, the actual flow definition data is described in the XML format. As illustrated in FIG. 7, tags serving as a large number of descriptors are buried in the flow definition data in the XML format.

A tag <ID> is a descriptor that sets a flow ID for identifying a workflow. A tag <Plugin> is a descriptor for describing processes of which a flow consists. A tag <PluginID> is a process ID for identifying the process. When <PluginID> is "ImageConverter", <PluginID> represents the image conversion process. When <PluginID> is "ToFolder", <PluginID> represents the folder distribution process. When <PluginID> is "ToEmail", <PluginID> represents the e-mail transmission process.

A tag <PluginType> is a descriptor for setting a type of the tag <PluginID>, that is, makes a setting on whether the process is an intermediate process or an output process. When <PluginType> is "Filter", <PluginType> represents an intermediate process and, when <PluginType> is "Output", <PluginType> represents the output process.

The tag <Parameter> is a descriptor for reflecting (setting) an input value of bibliographic information that is input by the user in the bibliographic information input screen that is displayed on the multi-function peripheral 100. In the example in FIG. 7, bibliographic information that is input is buried and set in positions of [ ] in codes 901 to 904 and thus are used for the processes of the workflow.

The description of the flow definition data illustrated in FIG. 7 in the XML format is an example, and the same content may be described in a different description by XML.

With reference to FIGS. 8 and 9, a screen for generating flow definition data will be described. On the flow definition data generation screen illustrated in FIG. 8, a list of buttons of the respective processes of the intermediate process and the output process is displayed on the left area. The flow definition data generation screen is, for example, stored in the flow storage unit 407 of the distribution server 400 and, in response to an operation performed by the manager on the input unit 502 to make a request for the flow definition data generation screen in the client 500, the flow definition data generation screen is transmitted from the communication unit 401 of the distribution server 400 to the communication unit 501 of the client 500. The flow definition data generation screen, which is received by the communication unit 501, is displayed by the display control unit 503 on the display unit 504.

The manager sequentially selects buttons of processes to be contained in the workflow from the above-described list on the flow definition data generation screen and arranges the buttons on desired positions in the right area by dragging and dropping with the input unit 502. In the contract flow in FIG. 8, the sign "o" in the right area denotes the scanning process and it is represented that it is defined that the processes are executed according to the order of the buttons following the scanning process according the arrows.

For example, the manager performs right clicking with the input unit 502 on the button of a desired process that is arranged in the right area in FIG. 8 and accordingly the operation information of the process is transmitted from the communication unit 501 of the client 500 to the communication unit 401 of the distribution server 400. When the communication unit 401 receives operation information, the flow definition generator 405 of the distribution server 400 transmits the process setting dialog box corresponding to the above-described process that is stored in the flow storage unit 407 to the communication unit 501 of the client 500 via the communication unit 401. The display control unit 503 displays the process setting dialog box received by the communication unit 501 on the display unit 504. The process setting dialog box makes it possible to set input values of the bibliographic information, which is input on the multi-function peripheral 100, as parameters for the process content. In other words, the input values of the bibliographic information are used when the process is executed according to the flow definition data.

A specific example of the process setting dialog box illustrated in FIG. 9 will be described. The process setting dialog box illustrated in FIG. 9 is a process setting dialog box of the e-mail transmission process. In the example illustrated in FIG. 9, input values of bibliographic information that are input on the bibliographic information input screen for the attached document name and the message body. In other words, by bracketing the tag names in the XML format that are specified in the attribute setting dialog box displayed in screen definition data generation, which will be described below, it is possible to refer to and set the input values of the bibliographic information. In the example illustrated in FIG. 9, "contaract[num]_[cont]_[dep]" is set for the attached document name and "The contract partner is [cont]" is set for the message body and accordingly the input values of the bibliographic information in which "num", "cont" and "dep" are set for tag names, respectively, are referred to in the e-mail transmission process.

When the manager defines a workflow with the input unit 502 on the flow definition data generation screen and performs execution and operation, the flow definition generator 405 of the distribution server 400 analyzes the process buttons, which are arranged in the right area of the flow definition data generation screen, and the order of the arrangement from the coordinates of the positions on the screen, etc., and acquires the content of the setting made on the process setting dialog box. The flow definition generator 405 determines a process ID corresponding to a process of each button and merges the content of the settings made on the processing setting dialog box in consideration of the order or the processes. The flow definition generator 405, for example, defines XML tags, converts the merged content into the XML format by using the tags, and generates flow definition data in the XML format illustrated in FIG. 7. The flow definition generator 405 causes the flow storage unit 407 to store the generated flow definition data.

The flow definition data is generated by using the flow definition data generation screen displayed on the display unit 504 of the client 500; however, the embodiments are not limited thereto. For example, a display device (not illustrated in the drawings) and an input device (not illustrated in the drawings) that are directly connected to the distribution server 400 may be used, the display device may display the flow definition data generation screen and the flow definition generator 405 may generate flow definition data according to operational inputs from the input device.

Screen Definition Data Generation Process

Figures 15, 16:
FIG. 15 is a diagram illustrating an exemplary bibliographic information input screen.
FIG. 16 is a diagram illustrating an exemplary table contained in a database that a database server has according to the embodiment.

FIG. 10 is a diagram illustrating exemplary description content of the screen definition data. FIG. 11 is a diagram illustrating an exemplary screen definition data generation screen. FIG. 12 is a diagram illustrating an exemplary attribute setting dialog box for a character-type bibliographic information item. FIG. 13 is a diagram illustrating an exemplary attribute setting dialog box for a numeric-type bibliographic information item. FIG. 14 is a diagram illustrating an exemplary attribute setting dialog box for a drop-down-list-type bibliographic information item. FIG. 15 is a diagram illustrating an exemplary bibliographic information input screen. FIG. 16 is a diagram illustrating an exemplary table contained in a database that a database server has according to the embodiment. With reference to FIGS. 10 to 16, the screen definition data generation process will be described.

First of all, with reference to FIG. 10, exemplary specific description content of the screen definition data that defines the bibliographic information input screen enabling an input of bibliographic information necessary for the series of processes that are defined by the flow definition data will be described. As described above, the actual screen definition data is described in the XML format. As illustrated in FIG. 10, tags serving as a large number of descriptors are buried in the screen definition data in the XML format. The exemplary screen definition data illustrated in FIG. 10 defines the bibliographic information input screen enabling an input of a "contract number" and a "contract partner" as bibliographic information.

A tag <ID> is a descriptor for setting a definition data ID for identifying the screen definition data. The tag <Items> is a descriptor for setting an entry field allowing the user to input bibliographic information from the bibliographic information input screen that is generated from the screen definition data, a display name of the input field, and conditions on inputs in the field.

As described above, in the screen definition data illustrated in FIG. 10, the user inputs bibliographic information in which the input filed names (DisplayName) are a "contract number" and "a contract partner" from the bibliographic information input screen. It is possible to make, as input conditions, settings, for example, of an input data type (Type), such as a character type or a numeric type, of a maximum field length (MaxLength), on whether the input character string is dealt with as a password (IsPassword), of a character string to be validated (ValidationString), of a maximum value (MaxValue), of a minimum value (MinValue), of an input field (DisplayName), on whether it is editable (IsEnabled), and whether an input is necessary (IsRequired). When "true" is set for "IsPassword", it is masked with asterisks ("*") and displayed on the input.

Once a workflow is selected when the user starts a scanning operation on the multi-function peripheral 100, the bibliographic information input screen that is defined by the screen definition data corresponding to the workflow to be executed is transmitted from the distribution server 400. In this case, for example, the screen definition generator 406 of the distribution server 400 generates the bibliographic information input screen on the basis of the screen definition data that is associated with the flow definition data of the workflow to be executed and the bibliographic information input screen is transmitted to the communication unit 104 of the multi-function peripheral 100 via the communication unit 401. The bibliographic information input screen that is received by the communication unit 104 is displayed by the display control unit 107 on the display unit 110a of the operation panel 110.

The description of the screen definition data illustrated in FIG. 10 in the XML format is an example, and the same content may be described in a different description by XML.

With reference to FIGS. 11 to 14, the screen for generating screen definition data will be described. The screen definition data generation screen illustrated in FIG. 11 represents the case where screen definition data corresponding to the bibliographic information input screen enabling an input of bibliographic information, which is set in the contract flow illustrated in FIGS. 6 and 7. The screen definition data generation screen is, for example, stored in the screen storage unit 408 of the distribution server 400 and the screen definition data generation screen is transmitted from the communication unit 401 of the distribution server 400 to the communication unit 501 of the client 500 in response to an operation performed by the manager on the input unit 502 of the client 500 to make a request for a screen definition data generation screen. The screen definition data generation screen that is received by the communication unit 501 is displayed by the display control unit 503 on the display unit 504. On the screen definition data generation screen, as illustrated in FIG. 11, it is possible make settings for each of character-type, numeric-value-type, date-type, drop-down-list-type, and check-box-type bibliographic information items.

The bibliographic information input screen that is displayed on the display unit 110a of the operation panel 110 of the multi-function peripheral 100 is displayed in the same screen design as that configured in the screen definition data generation screen. Note that it is possible to make a setting not to display added bibliographic information items on the bibliographic information input screen.

On the screen definition data generation screen, the manager is able to specify, for each bibliographic information item, an initial value for display on the display unit 110a of the operation panel 110 of the multi-function peripheral 100.

The manager, for example, double clicks each bibliographic information item with the input unit 502 and accordingly the operational information is transmitted from the communication unit 501 of the client 500 to the communication unit 401 of the distribution server 400. Once the communication unit 401 receives operation information, the screen definition generator 406 of the distribution server 400 transmits an attribute setting dialog box corresponding to the bibliographic information item, which is stored in the screen storage unit 408, to the communication unit 501 of the client 500 via the communication unit 401. The attribute setting dialog box that is received by the communication unit 501 is displayed by the display control unit 503 on the display unit 504. The attribute setting dialog box enables detailed settings for the corresponding bibliographic information items.

With reference to FIGS. 12 to 14, a specific example of the attribute setting dialog box will be described. The attribute setting dialog box illustrated in FIG. 12 is an attribute setting dialog box of the character-type bibliographic information item. In the example illustrated in FIG. 12, it is possible on the operation panel 110 to make settings, as attributes, on whether it is possible to perform editing (when false, the value is displayed on the operation panel 110 but the user is unable to change the value and the manager sets a value as a fixed value), on whether inputting a value is essential, of a display name (a character string of a title displayed on the left in the text box), for a tag name to be used in the data in the XML format and a SQL sentence, for a maximum field length, on whether to display a password (when "true", the input value is masked with asterisks), and for a character string to be validated (a regular expression for checking the input value and, for example, when the character string has to be one starting with "A", "A*" is specified). In the example illustrated in FIG. 12, for example, "user name" is set for the display name and "user" is set for the tag name. When bibliographic information is input from the bibliographic information input screen displayed on the operation panel 110 to the bibliographic information item in which the character string to be validated is set, when the input value does not match the character string to be validated, an error message is displayed.

The attribute setting dialog box illustrated in FIG. 13 is an attribute setting dialog box of a numeric-value type bibliographic information item. In the example illustrated in FIG. 13, it is possible to make, as attributes, settings on whether it is possible to perform editing on the operation panel 110, on whether inputting a value is essential, for a display name, for a tag name to be used in data in the XML format and a SQL sentence, for a maximum value, and for a minimum value. In the example illustrated in FIG. 13, for example, "contract number" is set for the display name and "num" is set for the tag name.

The attribute setting dialog box illustrated in FIG. 14 is an attribute setting dialog box for a drop-down-list-type bibliographic information item. In the example illustrated in FIG. 14, it is possible to make, as attributes, settings on whether it is possible to perform editing on the operation panel 110, on whether inputting a value is essential, for a display name, for a tag name to be used in data in the XML format and a SQL sentence, for selection of a database server serving as a connection partner to be connected to which an inquiry is made by using a query (SQL sentence) that is set, and for selection of a file in which the query is set. In the example illustrated in FIG. 14, for example, a "department name" is set for the display name and "dep" is set for the tag name.

Furthermore, in FIG. 14, setting a query (SQL sentence) enables display of a value (extracted value) extracted by executing the query in the drop-down-list-type bibliographic information item. For the display, a database server to which an inquiry is made by using the set query is set in a connection partner item. For example, information that specifies a database server, such as a database server name or an IP address of the database server, is set as the connection partner. In the case of the configuration illustrated in FIG. 1, a setting is made such that the database server 300 is selected. In the example illustrated in FIG. 14, "database1" is selected as the connection partner and it suffices if "database1" is information specifying the database server 300. In a SQL query item, a site (path) in which a file (query file) that defines a query (SQL sentence) is stored is set with a reference button. It suffices if the query file is, for example, stored in the storage unit (not illustrated) of the client 500. In the example illustrated in FIG. 14, a file whose file name is "SQL.txt" is set to be referred to. By pressing an upload button, the communication unit 501 transmits the query file that is set to be referred to, to the distribution server 400 via the network 2. Once the communication unit 401 of the distribution server 400 receives the query file, the query control unit 404 stores the query file that is received by the communication unit 401 in the query storage unit 409 in association with the screen definition data being generated on the screen definition data generation screen and the bibliographic information item in which the query is set (the drop-down-list-type item corresponding to the attribute setting dialog box in FIG. 14).

In the query file that is uploaded in the attribute setting dialog box in FIG. 14, for example, a SQL sentence like the following (1) is defined.

SELECT department name FROM employee table
WHERE username=[user]     (1)

As (1) contains [user] representing a tag name, when a character string (user name) is input in a bibliographic information input screen item whose tag name is "user", that is, an item corresponding to the attribute setting dialog box in FIG. 12, the user name input in this item as bibliographic information is replaced with [user]" and an inquiry is made to the database server 300 by using the query of the replaced SQL sentence. The query of (1) is an SQL sentence to extract, from the "employee table" (for example, the employee table 1000 represented in FIG. 16) that is stored as the bibliographic information table (association information) in the database 303 of the database server 300, the corresponding value of the column "department name" in the case where the column "user name" is a character string with which [user] is replaced (in other words, an input value of bibliographic information corresponding to the tag name). The employee table 1000 illustrated in FIG. 16 is an exemplary bibliographic information table to which an inquiry is made by using the query that is set in the attribute setting dialog box, where "user name", "department name", and "extension number", etc., are registered in association with one another.

When the manager defines a screen with the input unit 502 on the screen definition data generation screen and performs execution and operation, the screen definition generator 406 of the distribution server 400 acquires the content of settings made on the screen definition data generation screen and the content of settings made on the attribute setting dialog box for each item on the screen definition data generation screen. The screen definition generator 406 determines an ID of the screen definition data and merges the content of settings made on the attribute setting dialog boxes with the content of settings made on the screen definition data generation screen. The screen definition generator 406 defines XML tags, etc., converts the merged content into the XML format by using the tags, and generates screen definition data in the XML format (for example, the screen definition data illustrated in FIG. 10). The screen definition generator 406 stores the generated screen definition data in the screen storage unit 408. As described below, on receiving the flow ID of the workflow from the multi-function peripheral 100, the screen definition generator 406 generates bibliographic information input screen on the basis of the screen definition data that is associated with the workflow (flow definition data) and transmits the bibliographic information input screen to the multi-function peripheral 100 via the communication unit 401. FIG. 15 illustrates the bibliographic information input screen corresponding to the screen definition data, which is generated by the screen definition generator 406 from the screen definition data generation screen illustrated in FIG. 11. As illustrated in FIG. 15, it is possible to input and set a "user name", a "department name", a "contract number" and a "contract partner" as bibliographic information that is used in the workflow corresponding to the bibliographic information input screen.

It suffices if the attribute setting dialog box corresponding to the "contract partner" among the items in the bibliographic information input screen illustrated in FIG. 15, for example, accords with the character-type attribute setting dialog box illustrated in FIG. 12.

In the attribute setting dialog boxes represented in FIGS. 12 to 14, it is possible to set a query in the drop-down-list-type attribute setting dialog box; however, the embodiments are not limited thereto and, needless to say, a query may be set as well in the attribute setting dialog box corresponding to each of data types including the character type, the numeric-value type, the date type and the check-box type. In this case, it suffices if, as illustrated in FIG. 14, it is possible to set a connection partner and a SQL query in each attribute setting dialog box.

Items to be selected that are registered in the drop-down-list-type item may be loaded from a file (such as a comma-separated values (CSV) file) that is stored by the manager or a query to extract an objective item (that is, a query not containing a tag name that refers to another item) may be set from the database server 300 that is set as the connection partner in the attribute setting dialog box and an extracted value obtained by executing the query may be loaded.

It suffices if the timing at which the query that is set in the attribute setting dialog box is executed (about which an inquiry is made) may be, for example, in the case where the query contains a tag name that refers to another bibliographic information item, one at which the bibliographic information item corresponding to the tag name is input. On the other hand, when the query does not contain a tag name that refers to another bibliographic information item, for example, the timing may be one at which the bibliographic information input screen is displayed on the display unit 110a.

The query that is set to be referred to in the attribute setting dialog box illustrated in FIG. 14 is stored in the query storage unit 409 of the distribution server 400 by pressing the upload button; however, the embodiments rare not limited thereto. For example, when the screen definition generator 406 generates the screen definition data on the screen definition data generation screen, the query (SQL sentence) set to be referred to may be incorporated into the screen definition data.

Screen definition data is generated by using the screen definition data generation screen displayed on the display unit 504 of the client 500; however, embodiments are not limited thereto. For example, a display device (not illustrated in the drawings) and an input device (not illustrated in the drawings) that are directly connected to the distribution server 400 may be used, the display device may display the screen definition data generation screen, and the screen definition generator 406 may generate screen definition data according to operational inputs from the input device.

Distribution Process Performed by Distribution System

Figure 17:
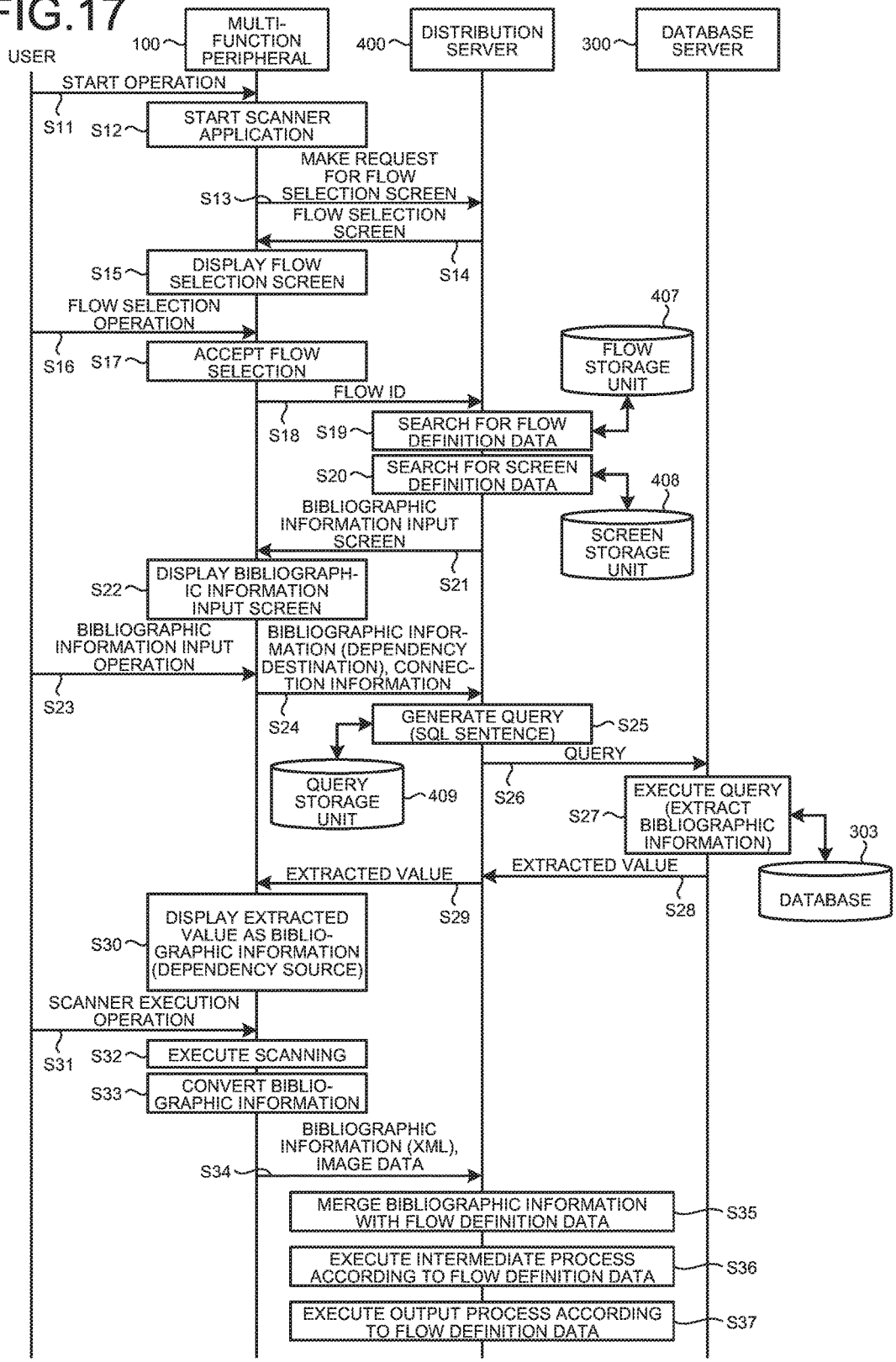
FIG. 17 is a sequence chart illustrating an exemplary flow of a distribution process of the distribution system according to the embodiment.

FIG. 17 is a sequence chart illustrating an exemplary flow of the distribution process performed by the distribution system according to the embodiment. FIG. 18 is a diagram illustrating an exemplary flow selection screen. FIG. 19 is a diagram illustrating an exemplary mode where bibliographic information of the dependency destination is input on the bibliographic information input screen. FIG. 20 is a diagram illustrating an exemplary mode where bibliographic information of the dependency source is input on the bibliographic information input screen. FIG. 21 is a diagram illustrating exemplary input values of bibliographic information converted into the XML format. FIG. 22 is a diagram illustrating exemplary content of the description of flow definition data in which input values of the bibliographic information are reflected. With reference to FIGS. 17 to 22, the flow of the distribution process performed by the distribution system 1 according to the embodiment will be described.

Steps S11 and S12

First of all, on the multi-function peripheral 100, when the user performs an operation of starting the scanner application 101 via the operation unit 110b of the operation panel 110, the scanner application 101 starts.

Step S13

The started scanner application 101 transmits a request for a flow selection screen to the distribution server 400 that the server information registered in the storage unit 109 represents via the communication unit 104.

Step S14

Once the request for a flow selection screen is received by the communication unit 401, the flow execution control unit 402 of the distribution server 400 transmits a flow selection screen to the multi-function peripheral 100 via the communication unit 401.

Step S15

Once the communication unit 104 receives the flow selection screen, the display control unit 107 of the multi-function peripheral 100 causes the display unit 110a of the operation panel 110 to display the flow selection screen. FIG. 18 illustrates an exemplary flow selection screen. On the flow selection screen illustrated in FIG. 18, any one of an "XXX flow", a "YYY flow", a "contract flow" and a "ZZZ flow" is selectable as a workflow. The respective workflows are assigned with flow IDs, respectively.

Step S16

A user performs an operation of selecting a desired workflow via the operation unit 110b from the flow selection screen displayed on the display unit 110a of the operation panel 110. The case where the "contract flow" represented in FIG. 18 is selected will be described.

Steps S17 and S18

The input control unit 108 accepts the operation of selecting a workflow and transmits the workflow ID of the selected workflow to the distribution server 400 via the communication unit 104.

Step 19

Once the communication unit 401 accepts the flow ID, the flow execution control unit 402 searches the flow storage unit 407 for the flow definition data represented by the flow ID.

Step S20

The flow execution control unit 402 further determines whether there is screen definition data that is associated with the flow definition data that is searched for. When there is screen definition data that is associated with the flow definition data, the flow execution control unit 402 searches the screen storage unit 408 for the screen definition data. The screen definition generator 406 then generates a bibliographic information input screen on the basis of the screen definition data that is searched for by the flow execution control unit 402.

Step S21

The flow execution control unit 402 transmits the bibliographic information input screen, which is generated by the screen definition generator 406, to the multi-function peripheral 100 via the communication unit 401. The bibliographic information input screen is generated by the distribution server 400 on the basis of the screen definition data; however, the embodiments are not limited thereto, and the screen definition data may be transmitted to the multi-function peripheral 100 and the bibliographic information output screen may be generated by the multi-function peripheral 100 on the basis of the screen definition data.

Step S22

Once the communication unit 104 receives the bibliographic information input screen, the display control unit 107 of the multi-function peripheral 100 causes the display unit 110a of the operation panel 110 to display the bibliographic information input screen (for example, the bibliographic information input screen illustrated in FIG. 15).

Step S23

The user performs an operation of inputting bibliographic information via the operation unit 110b from the bibliographic information input screen that is displayed on the display unit 110a of the operation panel 110. Once bibliographic information is input, the determination unit 105 of the multi-function peripheral 100 determines whether the input bibliographic information is bibliographic information on which a query that is set in other bibliographic information depends. For example, on the bibliographic information input screen illustrated in FIG. 15, as illustrated in FIG. 19, "Shigeru Akaishi" is input for the item corresponding to "user name". As the tag name of the "user name" bibliographic information is contained in the query that is set in the attribute setting dialog box corresponding to "department name" as described above, the determination unit 105 determines that the input "user name" bibliographic information (first bibliographic information) is the bibliographic information on which the query that is set for the "department name" depends.

Step S24

When the determination unit 105 determines that the input bibliographic information is bibliographic information on which the query that is set in other bibliographic information (bibliographic information of the dependency source) depends, the input control unit 108 transmits the input bibliographic information (bibliographic information of the dependency destination) and information (connection information) about the database server serving as the connection partner that is set in other bibliographic information to the distribution server 400 via the communication unit 104. In the example according to FIG. 19, "Shigeru Akaishi" that is input in the "user name" item is transmitted as bibliographic information of the dependency destination to the distribution server 400 and information representing the database server 300 is transmitted as the connection partner to the distribution server 400.

Step S25

Once the communication unit 401 receives the bibliographic information of the dependency destination and the connection information, the query control unit 404 reads the query file containing the tag name of the bibliographic information of the dependency destination from the query storage unit 409 and replaces the tag name in the query with the bibliographic information of the dependency destination to generate a complete query. For example, in the case of the QSL sentence (1), the following QSL sentence (2) is generated.

SELECT department name FROM employee table
    WHERE user name="Shigeru Akaishi"   (2)

Step S26

The query control unit 404 transmits the generated query to the database server 300 via the communication unit 401 according to the connection information that is received by the communication unit 401.

Step S27

Once the communication unit 301 of the database server 300 receives the query, the query execution unit 302 executes the received query and extracts bibliographic information that is specified by the query from the bibliographic information table, which is stored in the database 303. For example, when the query (2) is executed for the employee table 1000 serving as the bibliographic information table illustrated in FIG. 16, the query execution unit 302 extracts "development department" that is a value of the column "department name" in the record where the column "user name" is "Shigeru Akaishi".

Step S28

The query execution unit 302 transmits the value (extracted value) that is extracted from the database 303 by executing the query ("development department" in the exemplary query (2)) to the distribution server 400 via the communication unit 301.

Step S29

The communication unit 401 of the distribution server 400 transmits the extracted value that is received from the database server 300 to the multi-function peripheral 100.

Step S30

Once the communication unit 104 receives the extracted value, the display control unit 107 displays the extracted value in the item of the bibliographic information of the dependency source of the query on the bibliographic information input screen displayed on the display unit 110a. On the bibliographic information input screen illustrated in FIG. 19, the value of "development department" that is extracted by executing (2) is displayed in the item of "department name" (second bibliographic information) that is the bibliographic information of the dependency source as illustrated in FIG. 20. In other words, once the bibliographic information of the dependency destination is input on the bibliographic information input screen, the query is executed and thus the bibliographic information of the dependency source associated with the bibliographic information is extracted and displayed automatically. Accordingly, the user need not input the bibliographic information of the dependency source and this reduces the workload of the operation. The example illustrated in FIG. 20 represents the state where "Shigeru Akaishi", "development department", "5" and "XYZ" are set eventually as bibliographic information of "user name", "department name", "contract number" and "contract partner", respectively.

For the exemplary query (2), the operation of extracting the "development department" serving as the "department name" corresponding to "Shigeru Akaishi" serving as the "user name" has been described. Alternatively, multiple values may be extracted. For example, when "Shigeru Akaishi" belongs to multiple departments, that is, when multiple department names are registered as the values of the column "department name" in the record where the column "user name" is "Shigeru Akaishi" in the employee table 1000, the query (2) is executed and accordingly the multiple department names are extracted. In this case, it suffices if the display control unit 107 registers the extracted multiple department names in the "department name" drop-down list on the bibliographic information input screen. It suffices if the user selects one of the values registered in the "department name" drop-down list. Also in this case, as the user need not find out the corresponding department name from all the department names in the drop-down-list-type "department name" item, it suffices if the user selects one of the names of the multiple departments to which the user name "Shigeru Akaishi" belongs.

Step S31

The user performs the scanning execution operation via the operation unit 110b of the operation panel 110.

Step S32

Once the input control unit 108 accepts a scanning execution operation, the control unit 103 operates the scanner engine 111 to execute scanning an original.

Step S33

The bibliographic information converter 106 converts the bibliographic information that is input on the bibliographic information input screen into the XML format. FIG. 21 represents the example where the bibliographic information that is input on the bibliographic information input screen illustrated in FIG. 20 is converted into the XML format.

Step S34

The control unit 103 transmits the scanned image data and the bibliographic information that is converted by the bibliographic information converter 106 into the XML format to the distribution server 400 via the communication unit 104.

Step S35

Once the communication unit 401 receives the image data and the bibliographic information that is converted into the XML format, the flow execution control unit 402 merges (integrates) the received bibliographic information with the flow definition data. Specifically, in the case of the flow definition data illustrated in FIG. 7 and the bibliographic information in the XML format illustrated in FIG. 21, the flow execution control unit 402 performs the merging by replacing the tag names [num], [cont] and [dep] in the codes 901 to 904 of the flow dentition data illustrated in FIG. 7 with "5", "XYZ" and "development department", respectively. As a result, as in the flow definition data illustrated in FIG. 22, the file name is defined as "Contract5_XYZ_DevelopmentDepartment" in codes 1601 and 1604, the mail title name is defined as "Contract 5" in the code 1602, and "The contract partner is XYZ" is defined as the message body in the code 1603.

Steps S36 and S37

The flow execution control unit 402 executes the intermediate process and the output process according to the flow definition data with which the bibliographic information is merged.

According to the flow of steps S11 to S37, the distribution system 1 executes the distribution process.

As described above, the distribution system 1 according to the embodiment uses the bibliographic information that is input on the bibliographic information input screen when the multi-function peripheral 100 performs the scanning process and, when the user inputs given bibliographic information (bibliographic information of the dependency destination) on the bibliographic information input screen, a query is generated on the basis of the input value and executed and accordingly the bibliographic information (the bibliographic information of the dependency source) associated with the given bibliographic information is extracted and displayed in the corresponding item on the bibliographic information input screen. Accordingly, the user need not input the bibliographic information of the dependency source manually and this makes it possible to reduce the workload of the operation of inputting bibliographic information and inhibits occurrence of input errors caused by the user. Furthermore, even when multiple pieces of bibliographic information of the dependency source associated with the bibliographic information of the dependency destination are extracted, it suffices if bibliographic information is selected from multiple extracted values and this also reduces the workload of the inputting operation performed by the user.

An increase in the number of pieces of bibliographic information of the dependency source that are able to depend on the given bibliographic information among pieces of bibliographic information on the bibliographic information input screen increases the number of pieces of bibliographic information that are extracted according to the query and automatically displayed as bibliographic information of the dependency source in response to the input of the given bibliographic information, which further reduces the workload of the inputting operation performed by the user and makes it possible to further inhibit occurrence of input errors caused by the user.

As described above, when the user inputs given bibliographic information (bibliographic information of the dependency destination), by generating and executing a query based on the input value, bibliographic information (bibliographic information of the dependency source) associated with the given bibliographic information is extracted and the extracted bibliographic information is displayed in the corresponding item on the bibliographic information input screen; however, the embodiments are not limited thereto. For example, it suffices if, even without use of any SQL sentence as a query, information that associates pieces of bibliographic information (for example, a CSV file) is prepared and there is a system to extract bibliographic information of the dependency source associated with the given bibliographic information (bibliographic information of the dependency destination).

Furthermore, the bibliographic information table (for example, the employee table 1000 illustrated in FIG. 16) is stored in the database server 300 (the database 303); however, the embodiments are not limited thereto, and the bibliographic information table may be stored in the external storage device 604 of the distribution server 400. In this case, it suffices if, by using the generated query, the query control unit 404 makes an inquiry to the external storage device 604 in which the bibliographic information table is stored.

In the above-described embodiment, in the case where at least any one of the functional units of the distribution system 1 is realized by executing a program, the program is embedded in a ROM, or the like, in advance and provided. The program that is executed by the distribution system 1 according to the embodiment may be configured such that the program is stored in a file in an installable format or an executable format in a computer-readable storage medium, such as a compact disc read only memory (CD-ROM), a flexible disk (FD), a compact disk-recordable (CD-R) or a digital versatile disc (DVD) and provided. The program executed by the distribution system 1 of the above-described embodiment may be configured such that the program is stored in a computer that is connected to a network, such as the Internet, and downloaded via the network and thus provided. The program executed in the distribution system 1 of the above-described embodiment may be configured such that the program is provided or distributed via a network, such as the Internet. The program that is executed by the distribution system 1 of the embodiments has a module configuration containing at least one of the above-described functional units and, in practical hardware, a CPU (the CPU 601, 701 or 801) reads the program from the above-described storage device (such as the external storage devices 604, 704 or 808) and executes the program and accordingly each of the above-described functional units is loaded into the main storage device and generated.

According to an embodiment, it is possible to reduce the workload of an operation of inputting bibliographic information that is used in a workflow.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device, comprising:
a first generator configured to generate screen definition information defining an input screen for inputting bibliographic information usable in flow definition information defining a workflow that is a flow of at least one process performable on image data;
a control unit configured to control of a display, of an image forming apparatus, to display the input screen based on the screen definition information;
a first acquisition unit configured to, upon first bibliographic information input from the input screen displayed being bibliographic information, on which second bibliographic information different from the first bibliographic information depends, receive the first bibliographic information and connection information from the image forming apparatus, generate a query from the first bibliographic information, and transmit the query based on the connection information, to acquire the second bibliographic information that is associated with the first bibliographic information; and a transmitter configured to transmit the second bibliographic information, acquired by the first acquisition unit, to the image forming apparatus for display of the second bibliographic information on a second input screen, different from the input screen.

2. The information processing device of claim 1, further comprising:

an integrator configured to integrate the bibliographic information set on the input screen, with the flow definition information; and a processing unit configured to execute a process on the image data according to the flow definition information integrated with the bibliographic information.

3. The information processing device of claim 2, further comprising a second acquisition unit configured to acquire the image data, input by the image forming apparatus, wherein the processing unit is configured to execute a process on the image data acquired by the second acquisition unit, according to the flow definition information.

4. The information processing device of claim 2, wherein the integrator is configured to replace a tag name defined in the flow definition information, with bibliographic information corresponding to the tag name among the bibliographic information set on the input screen, to integrate the bibliographic information.

5. The information processing device of claim 4, further comprising a second generator configured to set a flow of at least one process performed on the image data, to generate the flow definition information, wherein the second generator is configured to define, in the flow definition information, the tag name to allow the tag name to be replaced with at least a piece of bibliographic information among the bibliographic information set on the input screen.

6. The information processing device of claim 1, wherein the first generator is configured to set a query for extracting the second bibliographic information, associated with the first bibliographic information, from the association information, and the first acquisition unit is configured to execute the query to association information, to extract and acquire the second bibliographic information from the association information.

7. The information processing device of claim 6, wherein the first generator is configured to be able to set a query specifying bibliographic information that is dependency destination, with respect to each input item in the input screen based on the screen definition information.

8. An information processing method comprising:

generating screen definition information defining an input screen for inputting bibliographic information usable in flow definition information defining a workflow that is a flow of at least one process performable on image data;

controlling a display of an image forming apparatus to display the input screen based on the screen definition information;

receiving, upon first bibliographic information input from the input screen displayed being bibliographic information, on which second bibliographic information different from the first bibliographic information depends, the first bibliographic information and connection information from the image forming apparatus, generating a query from the first bibliographic information, and transmitting the query based on the connection information, to acquire the second bibliographic information that is associated with the first bibliographic information; and transmitting the second bibliographic information acquired to the image forming apparatus for display of the second bibliographic information on a second input screen, different from the input screen.

9. The information processing method of claim 8, further comprising:

integrating the bibliographic information set on the input screen, with the flow definition information; and executing a process on the image data according to the flow definition information integrated with the bibliographic information.

10. The information processing method of claim 9, further comprising second acquiring the image data, input by the image forming apparatus, wherein during the executing, a process is executed on the image data acquired at the second acquiring, according to the flow definition information.

11. The information processing method of claim 9, wherein during the integrating, a tag name defined in the flow definition information, is replaced with bibliographic information corresponding to the tag name among the bibliographic information set on the input screen, to integrate the bibliographic information.

12. The information processing method of claim 11, further comprising:

setting a flow of at least one process performed on the image data, to generate the flow definition information, wherein during the setting, the tag name to allow the tag name to be replaced with at least any piece of bibliographic information among the bibliographic information set on the input screen, is defined in the flow definition information.

13. The information processing method of claim 8, wherein during the generating, a query for extracting the second bibliographic information associated with the first bibliographic information, from the association information, is set, and during the first acquiring, the query is executed to association information, to extract and acquire the second bibliographic information from the association information.

14. The information processing method of claim 13, wherein during the generating, a query specifying bibliographic information that is dependency destination, is settable with respect to each input item in the input screen based on the screen definition information.

15. A non-transitory computer-readable medium including programmed instructions that cause a computer to function as:

a first generator configured to generate screen definition information defining an input screen for inputting bibliographic information usable in flow definition information defining a workflow that is a flow of at least one process performable on image data;

a control unit configured to control a display of an image forming apparatus to display the input screen based on the screen definition information;

a first acquisition unit configured to, upon first bibliographic information input from the input screen displayed being bibliographic information on which second bibliographic information different from the first bibliographic information depends, receive the first bibliographic information and connection information from the image forming apparatus, generate a query from the first bibliographic information, and transmit the query based on the connection information, to acquire the second bibliographic information that is associated with the first bibliographic information; and a transmitter configured to transmit the second bibliographic information, acquired by the first acquisition unit, to the image forming apparatus to display the second bibliographic information on a second input screen, different from the input screen.

16. The non-transitory computer-readable medium of claim 15, wherein the programmed instructions cause the computer to further function as:

an integrator configured to integrate the bibliographic information set on the input screen, with the flow definition information; and a processing unit configured to execute a process on the image data according to the flow definition information integrated with the bibliographic information.

17. The non-transitory computer-readable medium of claim 16, wherein the programmed instructions cause the computer to further function as a second acquisition unit configured to acquire the image data, input by the image forming apparatus, and the processing unit is configured to execute a process on the image data acquired by the second acquisition unit, according to the flow definition information.

18. The non-transitory computer-readable medium of claim 16, wherein the integrator is configured to replace a tag name defined in the flow definition information, with bibliographic information corresponding to the tag name among the bibliographic information set on the input screen, to integrate the bibliographic information.

19. The non-transitory computer-readable medium of claim 18, wherein the programmed instructions cause the computer to further function as a second generator configured to set a flow of at least one process performed on the image data, to generate the flow definition information, and the second generator is configured to define, in the flow definition information, the tag name to allow the tag name to be replaced with at least any piece of bibliographic information among the bibliographic information set on the input screen.

20. The non-transitory computer-readable medium of claim 15, wherein the first generator is configured to set a query for extracting the second bibliographic information associated with the first bibliographic information, from the association information, and the first acquisition unit is configured to execute the query to association information, to extract and acquire the second bibliographic information from the association information.

* * * * *